(12) United States Patent
Hou

(10) Patent No.: US 10,429,695 B2
(45) Date of Patent: Oct. 1, 2019

(54) ALIGNMENT METHOD OF FFS LIQUID CRYSTAL DISPLAY PANEL

(71) Applicant: Shenzhen China Star Optoelectronics Technology Co., Ltd., Shenzhen (CN)

(72) Inventor: Jun Hou, Shenzhen (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 136 days.

(21) Appl. No.: 15/551,291

(22) PCT Filed: Jun. 20, 2017

(86) PCT No.: PCT/CN2017/089267
§ 371 (c)(1),
(2) Date: Aug. 16, 2017

(87) PCT Pub. No.: WO2018/214207
PCT Pub. Date: Nov. 29, 2018

(65) Prior Publication Data
US 2018/0341133 A1    Nov. 29, 2018

(30) Foreign Application Priority Data

May 23, 2017  (CN) .......................... 2017 1 0370747

(51) Int. Cl.
*G02F 1/1337* (2006.01)
*G02F 1/1333* (2006.01)
(Continued)

(52) U.S. Cl.
CPC ........ *G02F 1/1337* (2013.01); *G02F 1/13338* (2013.01); *G02F 1/133514* (2013.01);
(Continued)

(58) Field of Classification Search
CPC ............ G02F 1/1337; G02F 1/133711; G02F 1/133723; G02F 1/13338; G02F 1/133788;
(Continued)

(56) References Cited

U.S. PATENT DOCUMENTS

2018/0095308 A1* 4/2018 Gu .................... G02F 1/133514

FOREIGN PATENT DOCUMENTS

| CN | 1700077 A | 11/2005 |
| CN | 101464585 A | 6/2009 |

(Continued)

*Primary Examiner* — Ruiyun Zhang
(74) *Attorney, Agent, or Firm* — Leong C. Lei

(57) ABSTRACT

The present invention provides an alignment method of an FFS liquid crystal display panel. The method includes adding a light-sensitive small-molecule compound in a rubbing alignment material, carrying out rubbing alignment after formation of an alignment film, and afterwards, conducting boxing of the FFS liquid crystal display panel, and then applying an electrical voltage to cause liquid crystal molecules to rotate to a position substantially parallel to a substrate, and carrying out UV irradiation to cause polymerization of the light-sensitive small-molecule compound to form polymer bumps so as to keep the liquid crystal molecules in parallel to the substrate. The liquid crystal molecules, after the alignment, show a pre-tilt angle having a zero angle value and can, under the condition of providing a strong anchoring force of the alignment film, reduce the pre-tilt angle of the liquid crystal molecules and improve quality of displaying of the FFS liquid crystal display panel.

12 Claims, 6 Drawing Sheets

(51) Int. Cl.
*G02F 1/1335* (2006.01)
*G02F 1/1343* (2006.01)
*G06F 3/041* (2006.01)

(52) U.S. Cl.
CPC ...... *G02F 1/134309* (2013.01); *G06F 3/0412* (2013.01); *G02F 2001/134372* (2013.01); *G02F 2201/121* (2013.01); *G02F 2201/123* (2013.01); *G06F 2203/04103* (2013.01); *Y10T 428/10* (2015.01); *Y10T 428/1005* (2015.01); *Y10T 428/1023* (2015.01)

(58) Field of Classification Search
CPC ......... G02F 1/133514; G02F 1/134309; G02F 2001/133738; G02F 2001/134372; Y10T 428/10; Y10T 428/1005; Y10T 428/1023
USPC ........ 428/1.1, 1.2, 1.25, 1.26; 427/162, 553, 427/557, 558; 349/123, 126, 132
See application file for complete search history.

(56) References Cited

FOREIGN PATENT DOCUMENTS

| CN | aN104035238 A | 9/2014 |
|---|---|---|
| CN | aN105093694 A | 11/2015 |
| CN | aN105647548 A | 6/2016 |
| EP | 2853581 A1 | 4/2015 |

\* cited by examiner

ALIGNMENT METHOD OF FFS LIQUID CRYSTAL DISPLAY PANEL

BACKGROUND OF THE INVENTION

1. Field of the Invention

The present invention relates to the field of display technology, and more particular to an alignment method of a fringe field switching (FFS) liquid crystal display panel.

2. The Related Arts

With the development of the display technology, flat panel display devices, such as liquid crystal displays (LCDs), which show various advantages, such as high image quality, low power consumption, thin device body, and wide range of applications, have been widely used in various consumer electronic products, such as mobile phones, televisions, personal digital assistants (PDAs), digital cameras, notebook computers, and desktop computers and are becoming a main stream of display devices.

According to different ways of alignment, the mainstream liquid crystal display panels that are currently available in the market can be classified into the following types: vertical alignment (VA), twisted nematic (TN) or super twisted nematic (STN), in-plane switching (IPS) and fringe field switching (FFS).

Among these types, the FFS liquid crystal display panels show various advantages, such as high transmission and wide view angle, and have been widely used in medium- and small-sized displays, primarily mobile phone panels in particular. The so-called FFS liquid crystal display panels achieve the effect of displaying by means of an optical path difference, which results from liquid crystal molecules contained in a liquid crystal cell being caused by a fringe electric field to rotate in a plane parallel to substrates, through upper and lower polarizers. Thus, liquid crystal molecules of the FS liquid crystal display panel need to align horizontally. Contemporary alignment techniques are generally classified in two processes, which include: rubbing alignment and light alignment, wherein a specific process of the rubbing alignment is a fabric roller brushing and rubbing an alignment film to form grooves that are arranged in a predetermined direction so that liquid crystal molecules may be aligned in the direction of the grooves formed in the alignment film. Such a process involve easy operations and excellent photo-electrical performance and thermal stability are good after the alignment. However, the liquid crystal molecules, after the alignment, have a large pre-tilt angle, showing light leaking to some extents so as to affect contrast. On the other hand, the light alignment includes: adding reactive monomer (RM), which is a light-sensitive small-molecule compound, in a liquid crystal material and, after assembly of a panel, applying an electrical field to the panel to make the liquid crystal to rotate to a predetermined angle as being driven by the electrical field, and then irradiating ultraviolet (UV) light to cause RM contained in the liquid crystal material to generate a polymerization reaction on a surface of an alignment film to form polymer bumps and thus achieving an effect of alignment. The light alignment process effectively reduces the pre-tilt angle of the liquid crystal molecules and improves contrast, but shows high energy consumption and is easy to generate poor performance, such as residual image, due to poor surface anchoring power of the alignment film, so that the application is greatly limited.

SUMMARY OF THE INVENTION

An objective of the present invention are to provide an alignment method of a fringe field switching (FFS) liquid crystal display panel, which, under the condition of keeping a strong surface anchoring force of an alignment film, helps reduce a pre-tilt angle of liquid crystal molecules and improves quality of displaying of the FFS liquid crystal display panel.

To achieve the above objective, the present invention provides an alignment method of an FFS liquid crystal display panel, which comprises the following steps:

Step S1: providing a rubbing alignment material, a photo initiator, and a light-sensitive small-molecule compound, which can be reactive monomer, and mixing the rubbing alignment material, the photo initiator, and the light-sensitive small-molecule compound together to form an alignment film material;

Step S2: providing an array substrate and a color filter substrate and coating and curing the alignment film material on the color filter substrate and the array substrate to form two alignment films, wherein the array substrate comprises: a backing plate, a common electrode arranged on the backing plate, an insulation layer arranged on the common electrode, and a pixel electrode arranged on the insulation layer; and the common electrode is a continuous planar electrode that continuously covers the backing plate and the pixel electrode is a patterned electrode comprising slits;

Step S3: subjecting the alignment films to rubbing alignment treatment;

Step S4: aligning and boxing the array substrate and the color filter substrate, filling liquid crystal between the array substrate and the color filter substrate, and forming a touch control electrode on one side of the color filter substrate that is distant from the array substrate, wherein the touch control electrode is a continuous planar electrode that continuously covers the color filter substrate;

Step S5: applying an electrical voltage between the touch control electrode and the common electrode to make the liquid crystal that is located between the array substrate and the color filter substrate rotate to a position substantially parallel to the array substrate and at the same time, irradiating the alignment films with ultraviolet (UV) light to cause polymerization of the light-sensitive small-molecule compound contained in the alignment films; and Step S6: after complete polymerization of the light-sensitive small-molecule compound, removing the electrical voltage applied between the touch control electrode and the common electrode and stopping UV light irradiation on the alignment film, wherein a plurality of polymer bumps are formed on surfaces of the alignment films and the plurality of polymer bumps keep the liquid crystal in parallel to the array substrate.

The photo initiator takes a weight percentage of 0.1-1 wt % in the alignment film material.

The light-sensitive small-molecule compound takes a weight percentage of 0.1-2 wt % in the alignment film material.

The light-sensitive small-molecule compound comprises polyarylate small molecules.

The light-sensitive small-molecule compound has a chemical formula as follows:

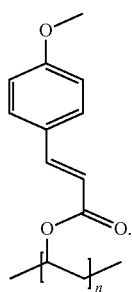

The rubbing alignment material comprises polyimide.

Step S2 applies a baking operation to cure the alignment film material, and the baking operation is conducted at a temperature of 120-200° C. for a time period of 15-60 minutes.

In Step S5, the electrical voltage applied between the touch control electrode and the common electrode is 5-15V.

In Step S5, UV light used in UV irradiation on the alignment films has a wavelength of 365 nm and energy of 30-100 mj.

The touch control electrode comprises a material of indium tin oxide (ITO).

The present invention also provides an alignment method of an FFS liquid crystal display panel, which comprises the following steps:

Step S1: providing a rubbing alignment material, a photo initiator, and a light-sensitive small-molecule compound, which can be reactive monomer, and mixing the rubbing alignment material, the photo initiator, and the light-sensitive small-molecule compound together to form an alignment film material;

Step S2: providing an array substrate and a color filter substrate and coating and curing the alignment film material on the color filter substrate and the array substrate to form two alignment films, wherein the array substrate comprises: a backing plate, a common electrode arranged on the backing plate, an insulation layer arranged on the common electrode, and a pixel electrode arranged on the insulation layer; and the common electrode is a continuous planar electrode that continuously covers the backing plate and the pixel electrode is a patterned electrode comprising slits;

Step S3: subjecting the alignment films to rubbing alignment treatment;

Step S4: aligning and boxing the array substrate and the color filter substrate, filling liquid crystal molecules between the array substrate and the color filter substrate, and forming a touch control electrode on one side of the color filter substrate that is distant from the array substrate, wherein the touch control electrode is a continuous planar electrode that continuously covers the color filter substrate;

Step S5: applying an electrical voltage between the touch control electrode and the common electrode to make the liquid crystal molecules that are located between the array substrate and the color filter substrate rotate to a position substantially parallel to the array substrate and at the same time, irradiating the alignment films with ultraviolet (UV) light to cause polymerization of the light-sensitive small-molecule compound contained in the alignment films; and Step S6: after complete polymerization of the light-sensitive small-molecule compound, removing the electrical voltage applied between the touch control electrode and the common electrode and stopping UV light irradiation on the alignment film, wherein a plurality of polymer bumps are formed on surfaces of the alignment films and the plurality of polymer bumps keep the liquid crystal molecules in parallel to the array substrate;

wherein the photo initiator takes a weight percentage of 0.1-1 wt % in the alignment film material; and wherein the light-sensitive small-molecule compound takes a weight percentage of 0.1-2 wt % in the alignment film material.

The efficacy of the present invention is that the present invention provides an alignment method of an FFS liquid crystal display panel. The method includes adding a light-sensitive small-molecule compound in a rubbing alignment material, carrying out rubbing alignment after formation of an alignment film, and afterwards, conducting boxing of the FFS liquid crystal display panel, and then applying an electrical voltage to cause liquid crystal molecules to rotate to a position substantially parallel to a substrate, and carrying out UV irradiation to cause polymerization of the light-sensitive small-molecule compound to form polymer bumps so as to keep the liquid crystal molecules in parallel to the substrate. The liquid crystal molecules, after the alignment, show a pre-tilt angle having a zero angle value and can, under the condition of providing a strong anchoring force of the alignment film, reduce the pre-tilt angle of the liquid crystal molecules and improve quality of displaying of the FFS liquid crystal display panel.

BRIEF DESCRIPTION OF THE DRAWINGS

For better understanding of the features and technical contents of the present invention, reference will be made to the following detailed description of the present invention and the attached drawings. However, the drawings are provided only for reference and illustration and are not intended to limit the present invention.

In the drawings.

DETAILED DESCRIPTION OF THE PREFERRED EMBODIMENTS

To further expound the technical solution adopted in the present invention and the advantages thereof, a detailed description will be given with reference to the preferred embodiments of the present invention and the drawings thereof.

Figure 7:
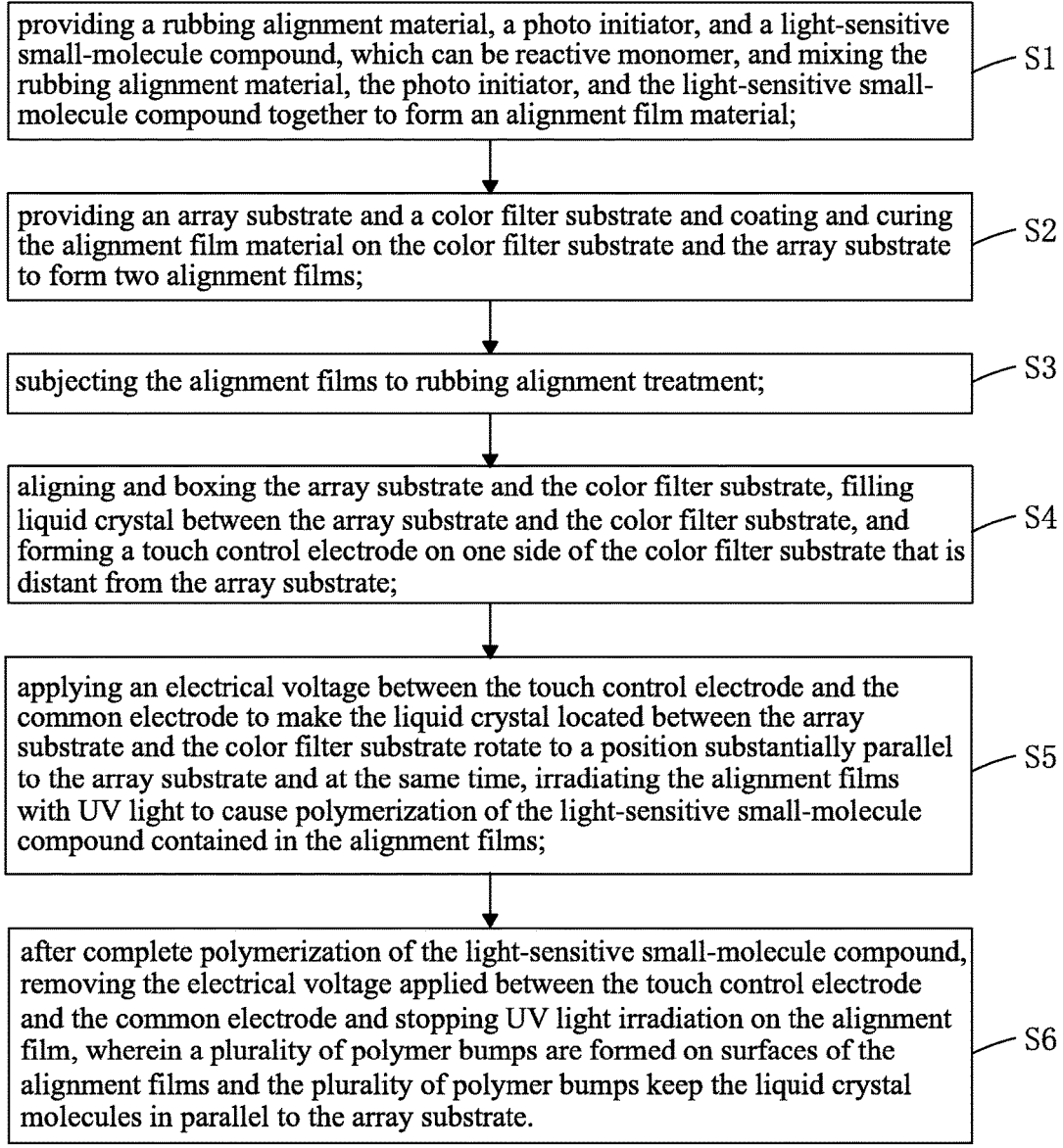
FIG. 7 is a flow chart illustrating the alignment method of the liquid crystal display panel according to the present invention.

Referring to FIG. 7, the present invention provides an alignment method of a fringe field switching (FFS) liquid crystal display panel, which comprises the following steps:

Step S1: providing a rubbing alignment material, a photo initiator, and a light-sensitive small-molecule compound, which can be reactive monomer, and mixing the rubbing alignment material, the photo initiator, and the light-sensitive small-molecule compound together to form an alignment film material.

Specifically, the photo initiator takes a weight percentage of 0.1 wt %-1 wt % in the alignment film material and the light-sensitive small-molecule compound takes a weight percentage of 0.1 wt %-2 wt % in the alignment film material.

Specifically, the rubbing alignment material can be a material that is used to make an alignment film in a known rubbing alignment process and, preferably, the rubbing alignment material comprises polyimide (PI). The light-sensitive small-molecule compound comprises polyarylate small molecules, and preferably, the light-sensitive small-molecule compound has a chemical formula as follows:

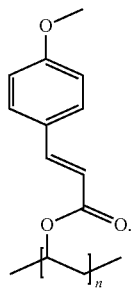

Figure 1:
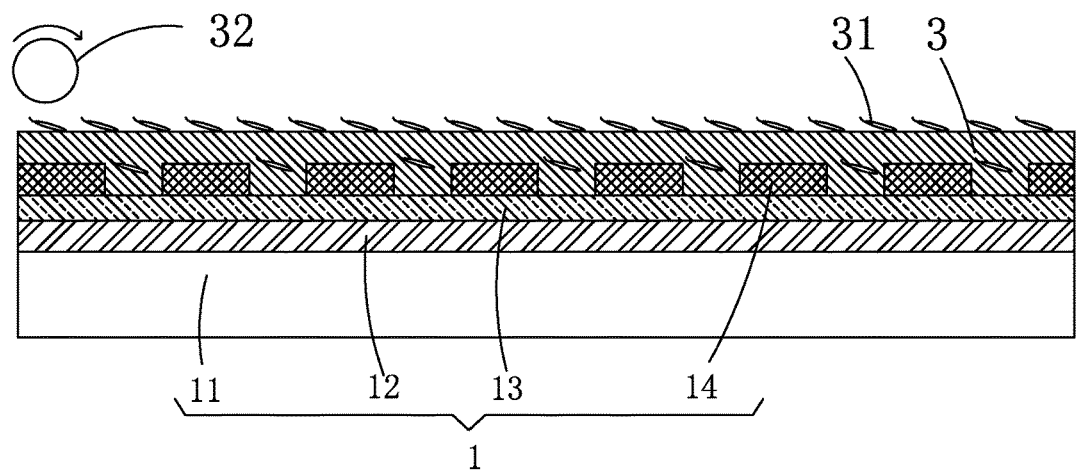
FIGS. 1 and 2 are schematic views respectively illustrating Step S2 and Step S3 of an alignment method of a fringe field switching (FFS) liquid crystal display panel according to the present invention.
Figure 2:
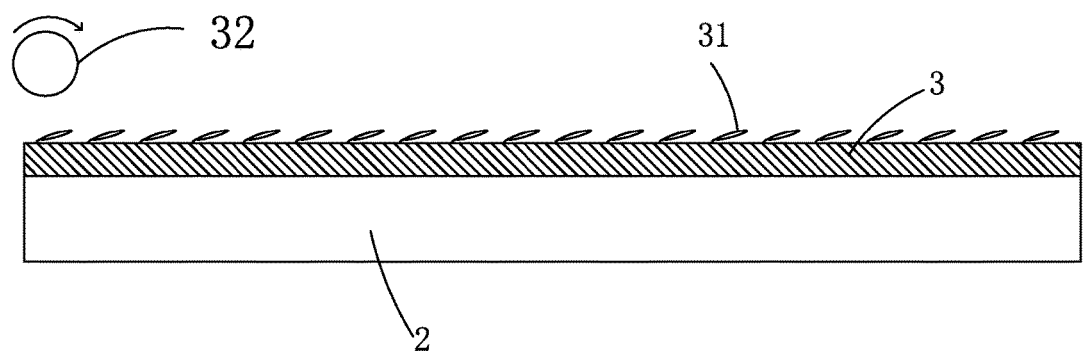

Step S2: as shown in FIGS. 1 and 2, providing an array substrate 1 and a color filter substrate 2 and coating and curing the alignment film material on the color filter substrate 2 and the array substrate 1 to form two alignment films 3.

Specifically, the array substrate 1 comprises: a backing plate 11, a common electrode 12 arranged on the backing plate 11, an insulation layer 13 arranged on the common electrode 12, and a pixel electrode 14 arranged on the insulation layer 13. The color filter substrate 3 is not limited to any specific structure and any color filter substrate that is fit for an FFS liquid crystal display panel can be used. Additional detail will be omitted herein.

More specifically, the common electrode 12 is a continuous planar electrode that continuously covers the backing plate 11 and the pixel electrode 14 is a patterned electrode comprising slits, whereby fringe electric fields may be generated between the common electrode 12 and the pixel electrode 14 to drive liquid crystal molecules to rotate in a plane parallel to the substrates.

In detail, Step S2 applies a baking operation to cure the alignment film material, and the baking operation is conducted at a temperature of 120-200° C. for a time period of 15-60 minutes. The alignment film 3 contains some light-sensitive small-molecule compound 31 distributed therein.

Step S3: as shown in FIGS. 1 and 2, subjecting the alignment films 3 to rubbing alignment treatment.

Specifically, Step S3 specifically uses a fabric hairy roller 32 to brush and rub the alignment films 3 to form grooves arranged in a predetermined direction.

Figure 3:
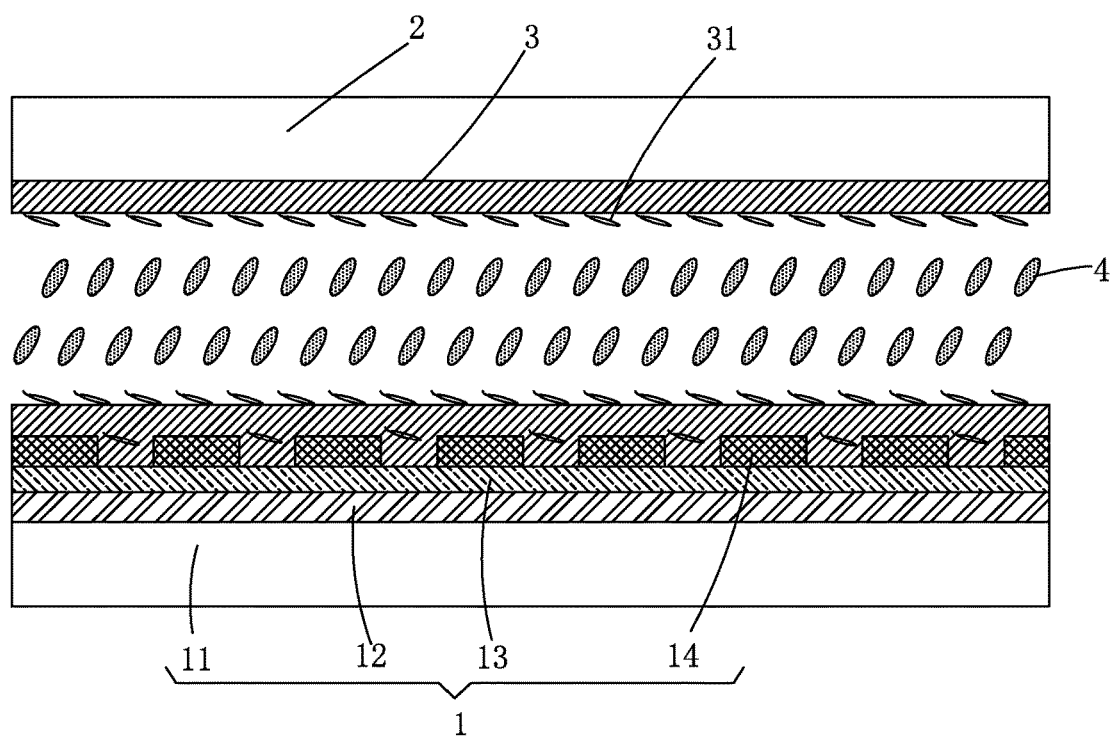
FIGS. 3 and 4 are schematic views illustrating Step S4 of the alignment method of the FFS liquid crystal display panel according to the present invention.
Figure 4:
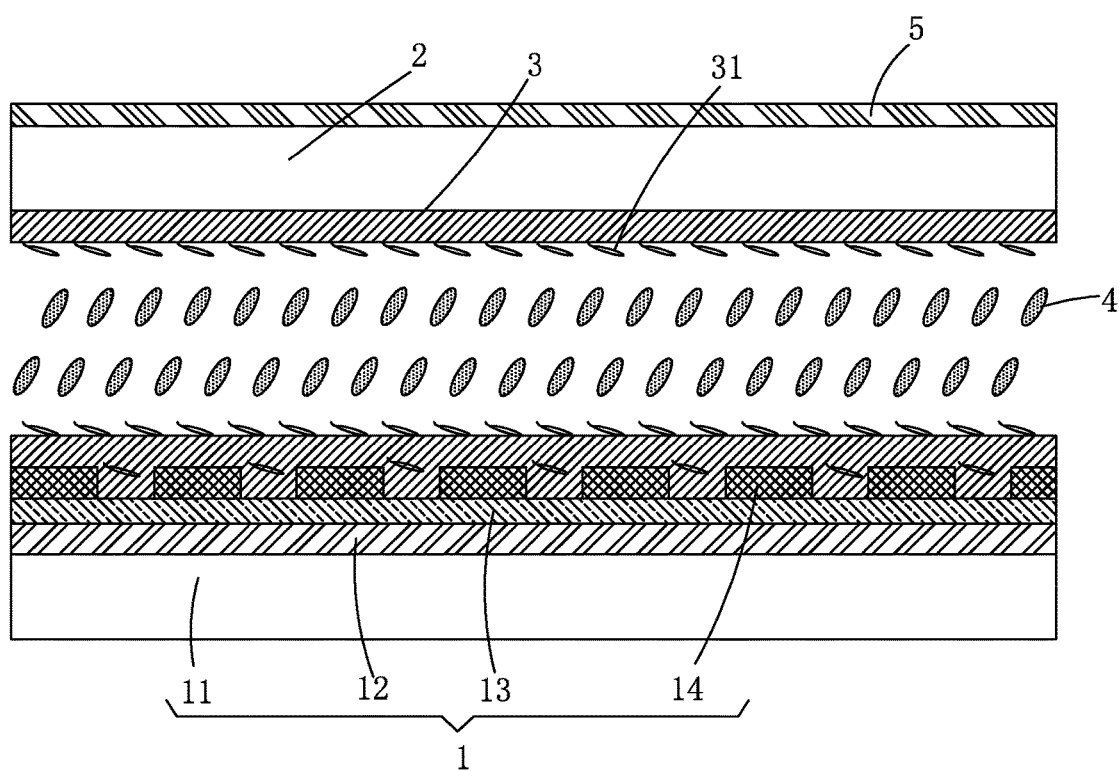

Step S4: referring to FIGS. 3 and 4, aligning and boxing the array substrate 1 and the color filter substrate 2, filling liquid crystal molecules 4 between the array substrate 1 and the color filter substrate 2, and forming a touch control electrode 5 on one side of the color filter substrate 2 that is distant from the array substrate 1, wherein the touch control electrode 5 is a continuous planar electrode that continuously covers the color filter substrate 2.

Specifically, in Step S4, the liquid crystal molecules 4 are controlled by the rubbing alignment treated alignment films 3 to show a pre-tilt angle having a relatively large angle value. The touch control electrode 5 is formed of a material comprising indium tin oxide (ITO).

Figure 5:
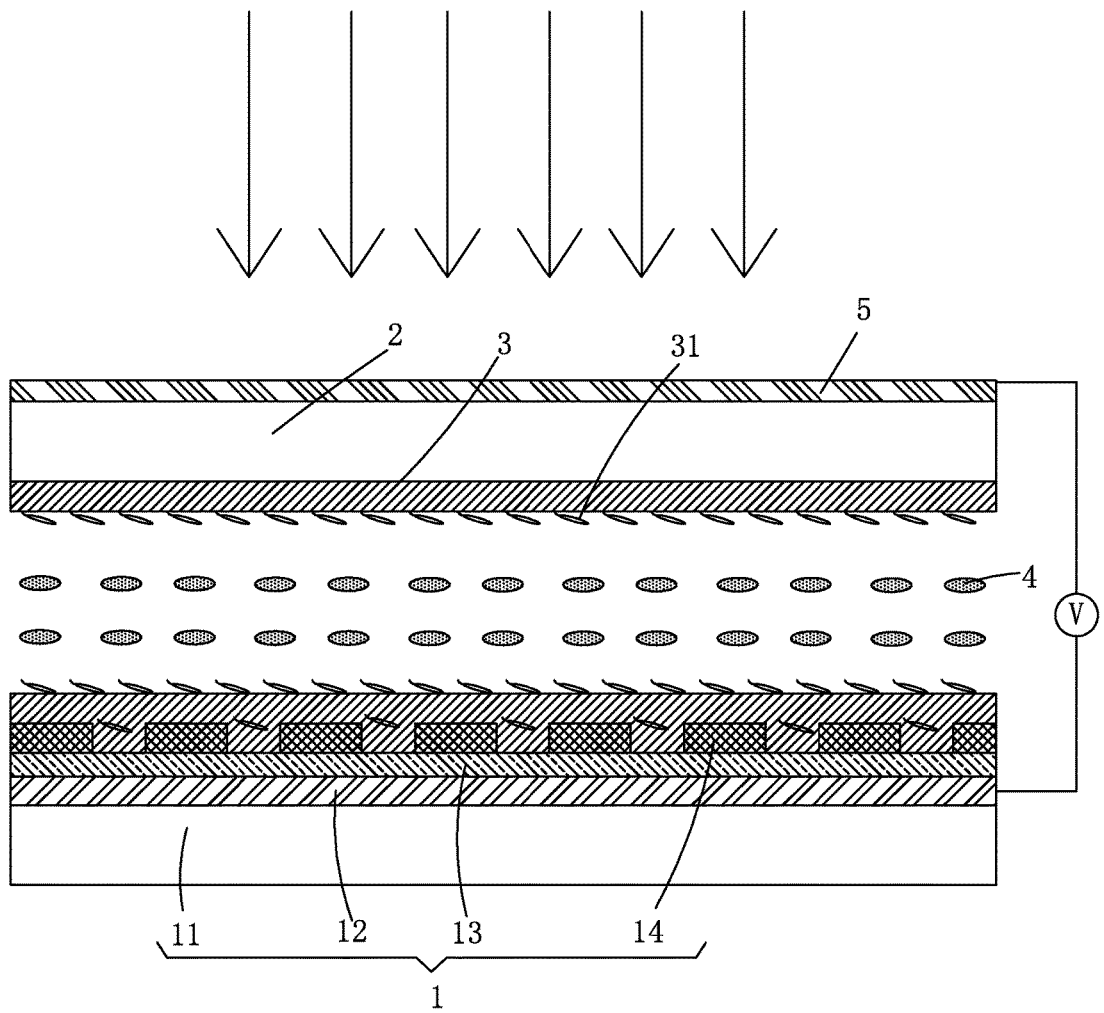
FIG. 5 is a schematic view illustrating Step S5 of the alignment method of the FFS liquid crystal display panel according to the present invention.

Step S5: referring to FIG. 5, applying an electrical voltage between the touch control electrode 5 and the common electrode 12 to make the liquid crystal molecules 4 that is located between the array substrate 1 and the color filter substrate 2 rotate to a position substantially parallel to the array substrate 1 and at the same time, irradiating the alignment films 3 with ultraviolet (UV) light to cause polymerization of the light-sensitive small-molecule compound 31 contained in the alignment films 3.

Specifically, in Step S5, the liquid crystal molecules 4 rotating to a position substantially parallel to the array substrate 1 means a liquid crystal axis of the liquid crystal molecules 4 is substantially parallel to the array substrate 1. The liquid crystal molecules 4 is controlled by the electrical voltage between the touch control electrode 5 and the common electrode 12 to rotate from an initial pre-tilt angle to a pre-tilt angle of which the angle value is zero.

Specifically, in Step S5, the electrical voltage applied between the touch control electrode 5 and the common electrode 12 is of a level of 5V-15V. In Step S5, the UV light used for UV irradiation of the alignment film 3 has a wavelength of 365 nm and carries energy of 30-100 mj.

Specifically, in a preferred embodiment of the present invention, the light-sensitive small-molecule compound undergoes a polymerization action as follows:

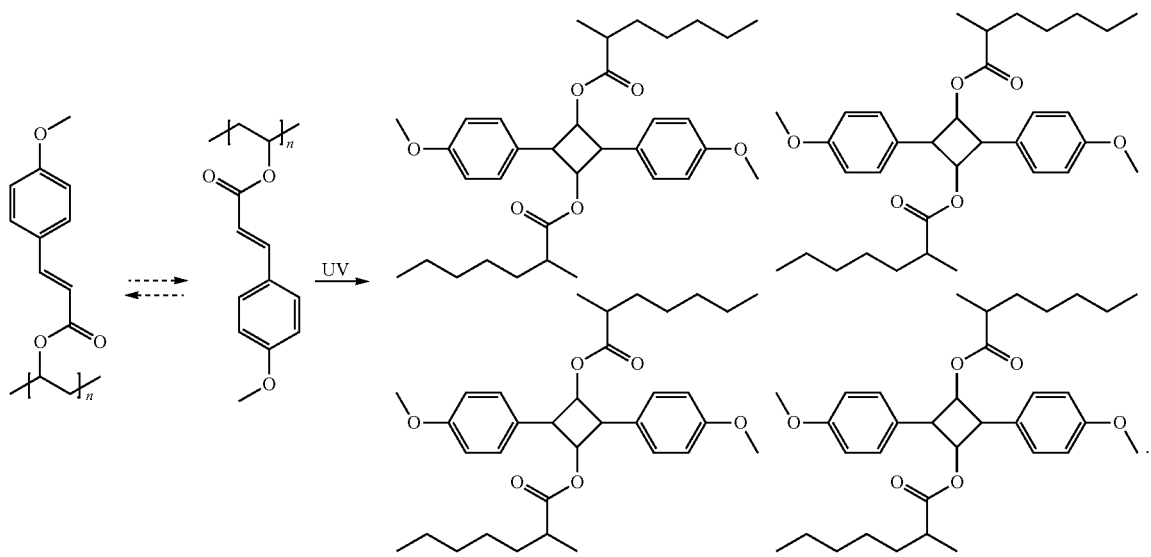

Figure 6:
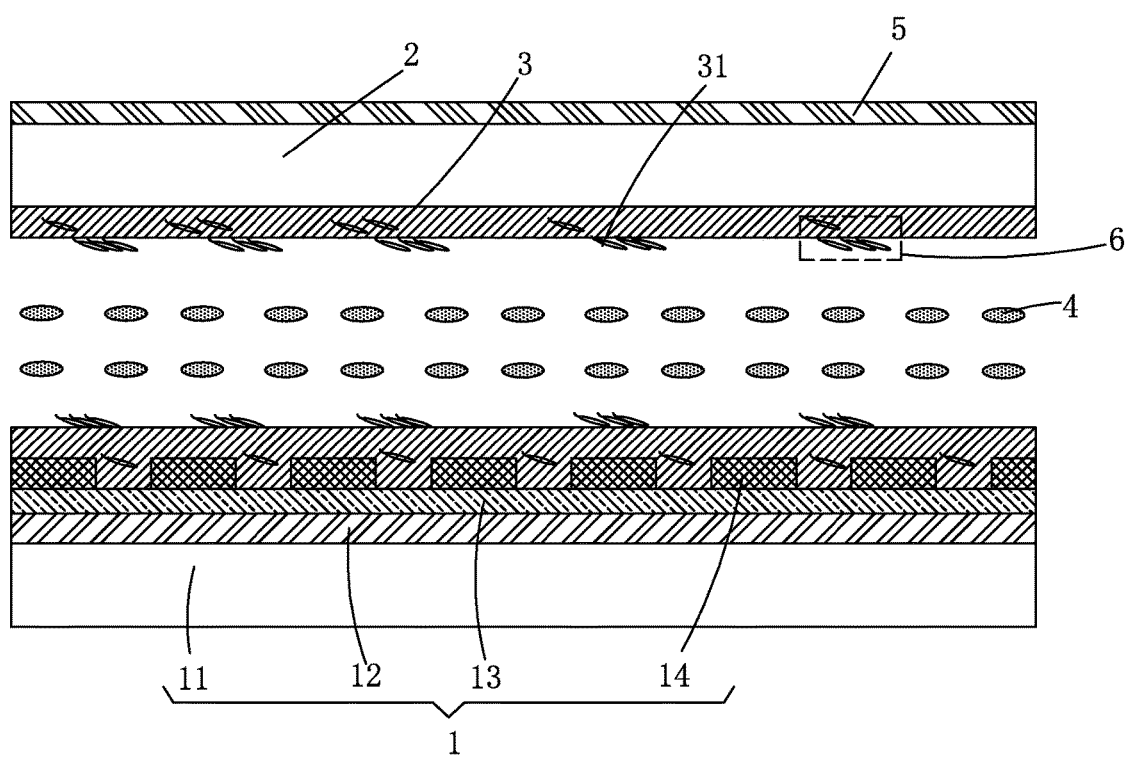
FIG. 6 is a schematic view illustrating Step S6 of the alignment method of the FFS liquid crystal display panel according to the present invention.

Step S6: referring to FIG. 6, after complete polymerization of the light-sensitive small-molecule compound 31, removing the electrical voltage applied between the touch control electrode 5 and the common electrode 12 and stopping UV light irradiation on the alignment film 3, wherein a plurality of polymer bumps 6 are formed on a surface of each of the alignment films 3 and the plurality of polymer bumps 6 keep the liquid crystal molecules 4 in parallel to the array substrate 1.

Specifically, in a preferred embodiment of the present invention, the light-sensitive small-molecule compound used shows an excellent attaching force to the alignment film 3 and have a main structure having dual-ring side chain alkyl similar to the liquid crystal molecules 4 so that a strong inter-acting force exists between the two. Under the condition of application of electric field and irradiation of UV light, the light-sensitive small-molecule compound reacts and interacts with surface-layer liquid crystal molecules in contact therewith to provide an effect of fixing the liquid crystal molecules 4 and making the pre-tilt angle almost zero. Compared to sole rubbing alignment, the alignment method of the present invention is more effective in generating a relatively small pre-tilt angle, reducing light leaking, and increasing contrast of image, and compared to sole light alignment, the present invention provides a more powerful anchoring force that helps eliminate residual image shown on a liquid crystal display panel.

In summary, the present invention provides an alignment method of an FFS liquid crystal display panel. The method includes adding a light-sensitive small-molecule compound in a rubbing alignment material, carrying out rubbing alignment after formation of an alignment film, and afterwards, conducting boxing of the FFS liquid crystal display panel, and then applying an electrical voltage to cause liquid crystal molecules to rotate to a position substantially parallel to a substrate, and carrying out UV irradiation to cause polymerization of the light-sensitive small-molecule compound to form polymer bumps so as to keep the liquid crystal molecules in parallel to the substrate. The liquid crystal molecules, after the alignment, show a pre-tilt angle having a zero angle value and can, under the condition of providing a strong anchoring force of the alignment film, reduce the pre-tilt angle of the liquid crystal molecules and improve quality of displaying of the FFS liquid crystal display panel.

Based on the description given above, those having ordinary skills in the art may easily contemplate various changes and modifications of the technical solution and the technical ideas of the present invention. All these changes and modifications are considered belonging to the protection scope of the present invention as defined in the appended claims.

What is claimed is:

1. An alignment method of a fringe field switching (FFS) liquid crystal display panel, comprising the following steps:
    Step S1: providing a rubbing alignment material that comprises polyimide, a photo initiator, and a light-sensitive small-molecule compound, and mixing the rubbing alignment material, the photo initiator, and the light-sensitive small-molecule compound together to form an alignment film material;
    Step S2: providing an array substrate and a color filter substrate and coating and curing the alignment film material on the color filter substrate and the array substrate to form two alignment films,
    wherein the array substrate comprises: a backing plate, a common electrode arranged on the backing plate, an insulation layer arranged on the common electrode, and a pixel electrode arranged on the insulation layer; and the common electrode is a continuous planar electrode that continuously covers the backing plate and the pixel electrode is a patterned electrode comprising slits; and the color filter substrate comprises a base board having an internal surface on which the alignment film material is coated, such that one of the alignment films that is formed on the color filter substrate is directly attached to the internal surface of the base plate;
    Step S3: subjecting the alignment films to rubbing alignment treatment;
    Step S4: aligning and attaching the array substrate and the color filter substrate, filling liquid crystal molecules between the array substrate and the color filter substrate, and forming an electrode on one side of the color filter substrate that is distant from the array substrate, wherein the electrode is a continuous planar electrode that continuously covers an external surface of the color filter substrate and is separate from and opposite to the one of the alignment films that is formed on the color filter substrate;
    Step S5: applying an electrical voltage between the electrode and the common electrode to make the liquid crystal molecules that are located between the array substrate and the color filter substrate rotate to a position substantially parallel to the array substrate and at the same time, irradiating the alignment films with ultraviolet (UV) light to cause polymerization of the light-sensitive small-molecule compound contained in the alignment films.

2. The alignment method of the FFS liquid crystal display panel as claimed in claim 1, wherein the photo initiator takes a weight percentage of 0.1-1 wt % in the alignment film material.

3. The alignment method of the FFS liquid crystal display panel as claimed in claim 1, wherein the light-sensitive small-molecule compound takes a weight percentage of 0.1-2 wt % in the alignment film material.

4. The alignment method of the FFS liquid crystal display panel as claimed in claim 1, wherein Step S2 applies a baking operation to cure the alignment film material, and the baking operation is conducted at a temperature of 120-200° C. for a time period of 15-60 minutes.

5. The alignment method of the FFS liquid crystal display panel as claimed in claim 1, wherein in Step S5, the electrical voltage applied between the electrode of the color filter substrate and the common electrode of the array substrate is 5-15V.

6. The alignment method of the FFS liquid crystal display panel as claimed in claim 1, wherein in Step S5, UV light used in UV irradiation on the alignment films has a wavelength of 365 nm and energy of 30-100 mj.

7. The alignment method of the FFS liquid crystal display panel as claimed in claim 1, wherein the electrode of the color filter substrate comprises a material of indium tin oxide (ITO).

8. An alignment method of a fringe field switching (FFS) liquid crystal display panel, comprising the following steps:
    Step S1: providing a rubbing alignment material that comprises polyimide, a photo initiator, and a light-sensitive small-molecule compound, and mixing the rubbing alignment material, the photo initiator, and the light-sensitive small-molecule compound together to form an alignment film material;
    Step S2: providing an array substrate and a color filter substrate and coating and curing the alignment film material on the color filter substrate and the array substrate to form two alignment films, wherein the array substrate comprises: a backing plate, a common electrode arranged on the backing plate, an insulation layer arranged on the common electrode, and a pixel electrode arranged on the insulation layer; and the common electrode is a continuous planar electrode that continuously covers the backing plate and the pixel electrode is a patterned electrode comprising slits; and the color filter substrate comprises a base board having an internal surface on which the alignment film material is coated, such that one of the alignment films that is formed on the color filter substrate is directly attached to the internal surface of the base plate;

Step S3: subjecting the alignment films to rubbing alignment treatment;

Step S4: aligning and attaching the array substrate and the color filter substrate, filling liquid crystal molecules between the array substrate and the color filter substrate, and forming an electrode on one side of the color filter substrate that is distant from the array substrate, wherein the electrode is a continuous planar electrode that continuously covers an external surface of the color filter substrate and is separate from and opposite to the one of the alignment films that is formed on the color filter substrate;

Step S5: applying an electrical voltage between the electrode and the common electrode to make the liquid crystal molecules that are located between the array substrate and the color filter substrate rotate to a position substantially parallel to the array substrate and at the same time, irradiating the alignment films with ultraviolet (UV) light to cause polymerization of the light-sensitive small-molecule compound contained in the alignment films; and Step S6: after complete polymerization of the light-sensitive small-molecule compound, removing the electrical voltage applied between the touch control electrode and the common electrode and stopping UV light irradiation on the alignment film, wherein a plurality of polymer bumps are formed on surfaces of the alignment films and the plurality of polymer bumps keep the liquid crystal molecules in parallel to the array substrate;

wherein the photo initiator takes a weight percentage of 0.1-1 wt % in the alignment film material; and wherein the light-sensitive small-molecule compound takes a weight percentage of 0.1-2 wt % in the alignment film material.

9. The alignment method of the FFS liquid crystal display panel as claimed in claim 8, wherein Step S2 applies a baking operation to cure the alignment film material, and the baking operation is conducted at a temperature of 120-200° C. for a time period of 15-60 minutes.

10. The alignment method of the FFS liquid crystal display panel as claimed in claim 8, wherein in Step S5, the electrical voltage applied between the electrode of the color filter substrate and the common electrode of the array substrate is 5-15V.

11. The alignment method of the FFS liquid crystal display panel as claimed in claim 8, wherein in Step S5, UV light used in UV irradiation on the alignment films has a wavelength of 365 nm and energy of 30-100 mj.

12. The alignment method of the FFS liquid crystal display panel as claimed in claim 8, wherein the electrode of the color filter substrate comprises a material of indium tin oxide (ITO).

* * * * *